(12) United States Patent
Nakasato

(10) Patent No.: US 8,885,544 B2
(45) Date of Patent: Nov. 11, 2014

(54) BASE STATION, RELAY DEVICE AND COMMUNICATION SYSTEM

(75) Inventor: Yuuki Nakasato, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 198 days.

(21) Appl. No.: 13/579,484

(22) PCT Filed: Feb. 18, 2011

(86) PCT No.: PCT/JP2011/053461
§ 371 (c)(1),
(2), (4) Date: Aug. 16, 2012

(87) PCT Pub. No.: WO2011/102446
PCT Pub. Date: Aug. 25, 2011

(65) Prior Publication Data
US 2012/0307719 A1    Dec. 6, 2012

(30) Foreign Application Priority Data

Feb. 19, 2010 (JP) .................................. 2010-035412

(51) Int. Cl.
*H04W 4/00* (2009.01)
*H04B 7/14* (2006.01)
*H04W 72/04* (2009.01)
*H04B 7/155* (2006.01)
*H04W 84/04* (2009.01)

(52) U.S. Cl.
CPC ............ *H04W 72/04* (2013.01); *H04W 84/047* (2013.01); *H04B 7/155* (2013.01)
USPC ............................ 370/315; 370/329; 370/341

(58) Field of Classification Search
None
See application file for complete search history.

(56) References Cited

U.S. PATENT DOCUMENTS

| | | | |
|---|---|---|---|
| 2008/0056199 A1* | 3/2008 | Park et al. ..................... | 370/332 |
| 2010/0120360 A1* | 5/2010 | Haustein et al. ................ | 455/15 |
| 2011/0299614 A1* | 12/2011 | Kim et al. ..................... | 375/260 |
| 2011/0306291 A1* | 12/2011 | Ma et al. .......................... | 455/9 |
| 2011/0319012 A1* | 12/2011 | Park et al. ......................... | 455/7 |
| 2012/0033588 A1* | 2/2012 | Chung et al. .................. | 370/280 |
| 2012/0108164 A1* | 5/2012 | Yuda et al. ........................ | 455/9 |

FOREIGN PATENT DOCUMENTS

JP      2009-177628 A     8/2009

OTHER PUBLICATIONS

International Preliminary Report on Patentability issued for International Application No. PCT/JP2011/053461.
AARIB Standard, OFDMA/TDMA TDD Broadband Wireless Access System (Next Generation PHS), ARIB STD-T95 Version 1.3, Dec. 16, 2009, Association of Radio Industries and Businesses.
Office Action dated Jun. 5, 2014 issued for counterpart Chinese Patent Application No. 201180010038.1.

* cited by examiner

*Primary Examiner* — Chi H Pham
*Assistant Examiner* — Soon-Dong D Hyun
(74) *Attorney, Agent, or Firm* — Procopio, Cory, Hargreaves & Savitch LLP

(57) ABSTRACT

A base station includes a reception unit, a channel allocation unit, a relay channel designation unit, and a transmission unit. The reception unit receives a signal from a communication terminal communicating with the base station via a relay device. The channel allocation unit allocates a communication channel to the communication terminal communicating with the base station via the relay device. The relay channel designation unit designates a communication channel for a signal relayed by the relay device such that the communication channel allocated by the channel allocation unit to the communication terminal communicating with the base station via the relay device is included therein. The transmission unit transmits, to the relay device, a notification signal for notifying the relay device of the communication channel designated by the relay channel designation unit.

11 Claims, 13 Drawing Sheets

F I G. 1
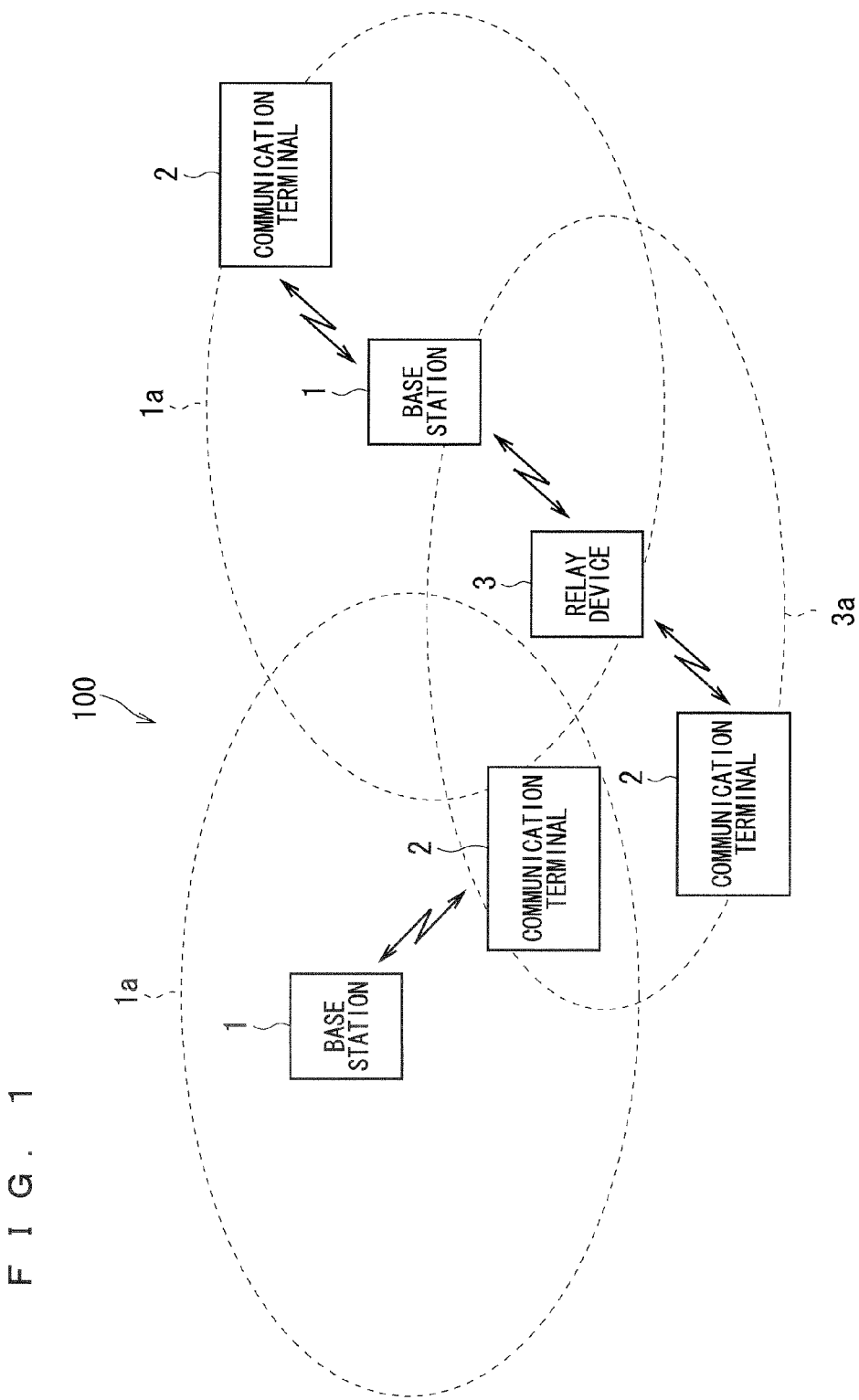

F I G. 3
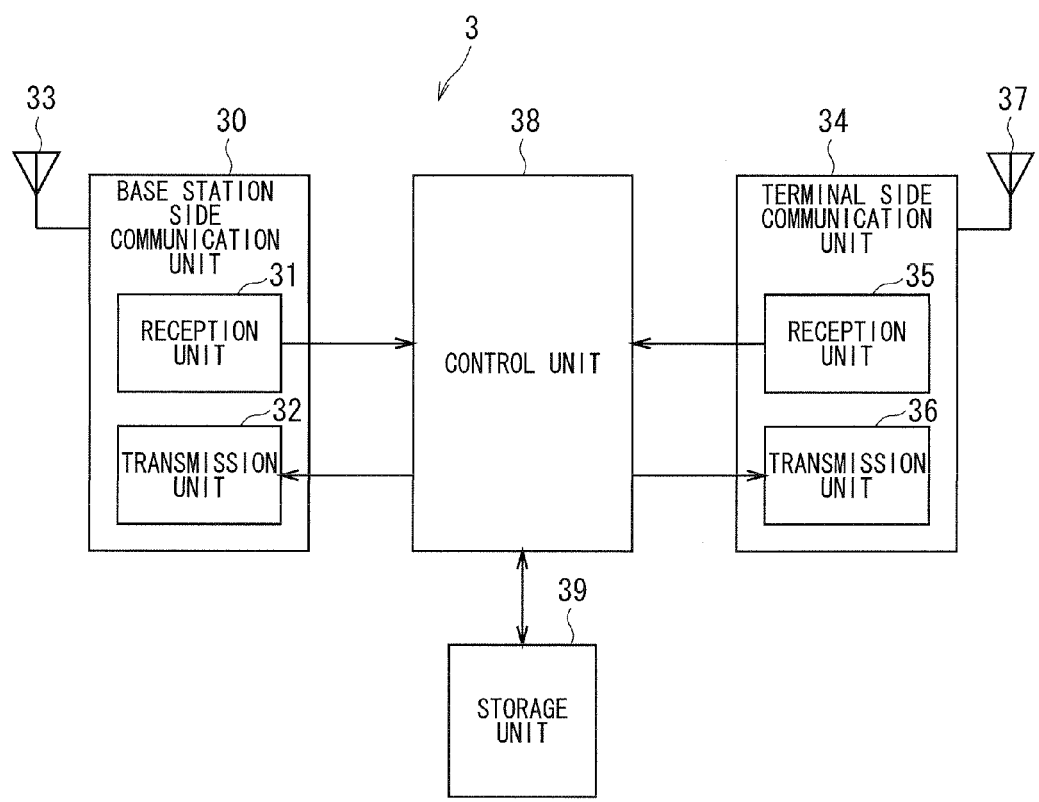

F I G. 4
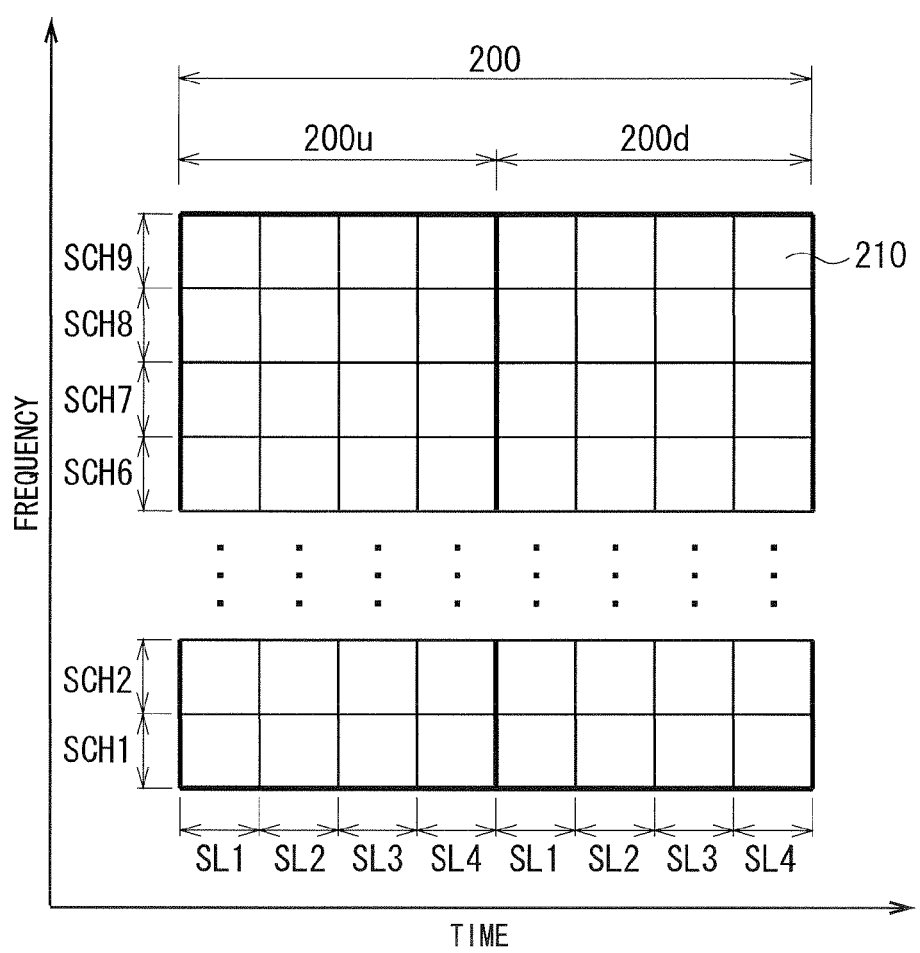

FIG. 7

|  | SL1 | SL2 | SL3 | SL4 |
|---|---|---|---|---|
| SCH1 | 0 | 0 | 0 | 0 |
| SCH2 | 0 | 0 | 0 | 0 |
| SCH3 | 0 | 0 | 0 | 0 |
| SCH4 | 0 | 1 | 0 | 0 |
| SCH5 | 0 | 1 | 0 | 0 |
| SCH6 | 1 | 1 | 0 | 0 |
| SCH7 | 1 | 0 | 0 | 0 |
| SCH8 | 1 | 0 | 0 | 0 |
| SCH9 | 0 | 0 | 0 | 0 |

F I G. 9

| SL1 | SL2 | SL3 | SL4 |
|-----|-----|-----|-----|
| 1   | 1   | 0   | 0   |

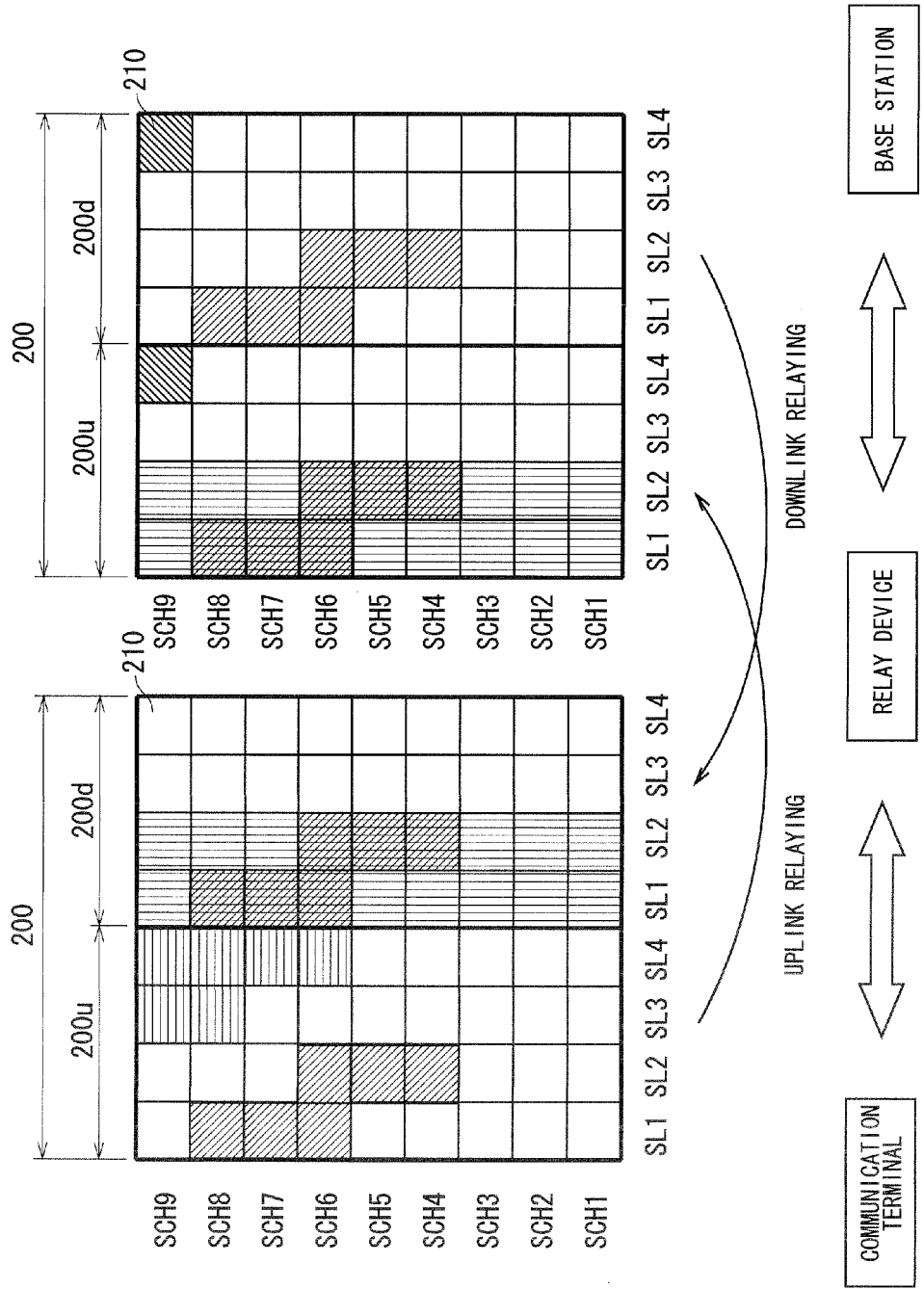

F I G . 1 1

| S C H 1 | S C H 2 | S C H 3 |
|---------|---------|---------|
| 0 | 0 | 0 |
| S C H 4 | S C H 5 | S C H 6 |
| 1 | 1 | 1 |
| S C H 7 | S C H 8 | S C H 9 |
| 1 | 1 | 0 |

BASE STATION, RELAY DEVICE AND COMMUNICATION SYSTEM

TECHNICAL FIELD

The present invention relates to communication between a base station and a relay device.

BACKGROUND ART

Conventionally, various techniques have been proposed for a communication system. For example, Non-Patent Document 1 discloses a standard for a communication system called a next-generation PHS (Personal Handyphone System). This standard is called XGP (eXtended Global Platform).

PRIOR-ART DOCUMENTS

Non-Patent Documents

Non-Patent Document 1: "OFDMA/TDMA TDD Broadband Wireless Access System (Next Generation PHS) ARIB STANDARD", ARIB STD-T95 Version 1.3, Dec. 16, 2009, Association of Radio Industries and Businesses

SUMMARY OF THE INVENTION

Problems to be Solved by the Invention

In a case where a communication terminal exists in a place having a poor coverage for radio waves from a base station because, for example, the communication terminal is located behind a building or inside a building, the base station may not be capable of direct communication with the communication terminal. Therefore, in a communication system, a relay device is located in a place having a poor coverage for radio waves from a base station, and a base station can communicate with a communication terminal via the relay device.

Such a relay device sometimes relays an unnecessary wave that originally does not reach the base station. This causes the base station to perform wasteful processing on the unnecessary wave relayed thereto. Additionally, in some cases, the unnecessary wave relayed to the base station by the relay device interferes with a signal supplied from a communication terminal that is in direct communication with the base station or a signal supplied from a communication terminal that is in communication with the base station via another relay device. As a result, the communication quality of communication between the base station and the communication terminal may deteriorate.

The present invention is made in view of the above-described points, and an object of the present invention is to provide a technique that can suppress a relay of an unnecessary wave from a relay device to a base station.

Means for Solving the Problems

A base station according to the present invention is a base station communicating with a communication terminal via a relay device, the base station including: a reception unit for receiving a signal from a communication terminal communicating with the base station via the relay device; a channel allocation unit for allocating a communication channel to a communication terminal communicating with the base station via the relay device; a relay channel designation unit for designating a communication channel for a signal relayed by the relay device such that a communication channel allocated by the channel allocation unit to a communication terminal communicating with the base station via the relay device is included therein; and a transmission unit for transmitting, to the relay device, a notification signal for notifying the relay device of a communication channel designated by the relay channel designation unit.

A base station according to the present invention is a base station for which the above-described base station is provided as a surrounding base station thereof, the base station including: a reception unit for receiving a signal from the surrounding base station; and a common channel setting unit for setting a common channel for downlink communication to a timing other than a timing when the reception unit receives a signal of a common channel in the surrounding base station. In a case where the reception unit receives a signal transmitted by the surrounding base station at a transmission timing paired with the first reception timing in a communication frame to which the first reception timing belongs, the common channel setting unit excludes, from a candidate to which a common channel for downlink communication is set, a transmission timing that is later than a timing of receiving the signal by an amount of delay of the second reception timing relative to the first reception timing. In a case where the reception unit receives the notification signal transmitted by the surrounding base station, the common channel setting unit does not exclude, from a candidate to which a common channel for downlink communication is set, a transmission timing that is later than a timing of receiving the notification signal by the amount of delay.

A relay device according to the present invention is a relay device for relaying a signal from a communication terminal to a base station and relaying a signal from a base station to a communication terminal, the relay device including: a base station side communication unit for communicating with a base station; a terminal side communication unit for communicating with a communication terminal; and a control unit for controlling the base station side communication unit and the terminal side communication unit. The base station side communication unit receives a notification signal transmitted from the base station, the notification signal being for notifying a communication channel for a signal relayed by the relay device. The control unit controls the base station side communication unit and the terminal side communication unit such that the relay device relays a signal of a communication channel notified by the notification signal.

A communication system according to the present invention is a communication system including: a base station communicating with a communication terminal via a relay device; and a relay device relaying a signal from a communication terminal to the base station and relaying a signal from the base station to a communication terminal. The base station includes: a reception unit for receiving a signal from a communication terminal communicating with the base station via the relay device; a channel allocation unit for allocating a communication channel to a communication terminal communicating with the base station via the relay device; a relay channel designation unit for designating a communication channel for a signal relayed by the relay device such that a communication channel allocated by the channel allocation unit to a communication terminal communicating with the base station via a relay device is included therein; and a transmission unit for transmitting, to the relay device, a notification signal for notifying the relay device of a communication channel designated by the relay channel designation unit. The relay device includes: a base station side communication unit for communicating with the base station; a terminal side communication unit for communicating with a communication terminal; and a control unit for controlling the base station side communication unit and the terminal side communication unit. The base station side communication unit receives a notification signal transmitted from the base station, the notification signal being for notifying a communication channel for a signal relayed by the relay device. The control unit controls the base station side communication unit and the terminal side communication unit such that the relay device relays a signal of a communication channel notified by the notification signal.

Effects of the Invention

The present invention can suppress a relay of an unnecessary wave from a relay device to a base station.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 A diagram showing a configuration of a communication system according to an embodiment.

FIG. 3 A diagram showing a configuration of a relay device according to the embodiment.

FIG. 4 A diagram showing a configuration of a TDMA/TDD frame according to the embodiment.

FIG. 7 A diagram showing one example of a relay channel notification signal.

FIG. 9 A diagram showing one example of the relay channel notification signal.

FIG. 10 A diagram showing a state of allocation of individual channels in the TDMA/TDD frame.

FIG. 11 A diagram showing one example of the relay channel notification signal.

EMBODIMENT FOR CARRYING OUT THE INVENTION

Figure 2:
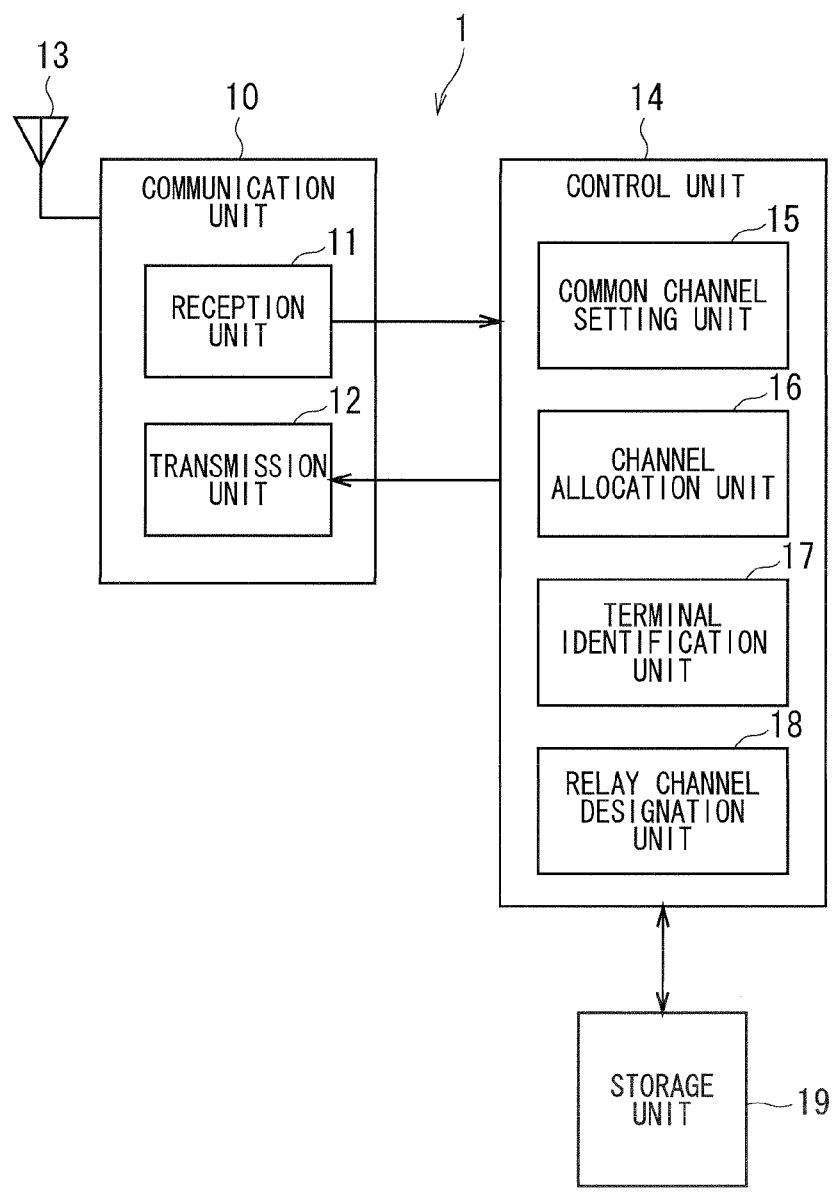
FIG. 2 A diagram showing a configuration of a base station according to the embodiment.

FIG. 1 is a diagram showing a configuration of a communication system 100 according to this embodiment. The communication system 100 according to this embodiment is, for example, a next-generation PHS, and includes a plurality of base stations 1. Each of the base stations 1 performs communication with a plurality of communication terminals 2 by the TDMA/TDD (Time Division Multiple Access/Time Division Duplexing) scheme. Each of the base stations 1 also adopts the OFDMA (Orthogonal Frequency Division Multiple Access) scheme as a multiple access scheme. In the OFDMA scheme, an OFDM (Orthogonal Frequency Division Multiplexing) signal in which a plurality of orthogonal subcarriers are combined is used.

As shown in FIG. 1, a communication area 1a (service area) of each base station 1 partially overlaps a communication area 1a of a surrounding base station 1. In the plurality of base stations 1, there is a base station 1 that performs communication with the communication terminal 2 via a relay device 3 (the right-hand base station 1 in FIG. 1). A communication area 3a of the relay device 3 partially overlaps the communication area 1a of the base station 1 that is an object of relaying of this relay device 3, and also partially overlaps the communication area 1a of the base station 1 located in the surroundings of the objective base station 1.

In an example shown in FIG. 1, one relay device 3 is provided for one base station 1, but in some cases, a plurality of relay devices 3 are provided for one base station 1. In the following description, if not otherwise specified, it is assumed that one relay device 3 is provided for one base station 1.

FIG. 2 is a block diagram showing a configuration of each base station 1. As shown in FIG. 2, each of the base stations 1 includes a communication unit 10, a control unit 14 for controlling the communication unit 10, and a storage unit 19 for storing various information. The communication unit 10 communicates directly with the communication terminal 2, or communicates with the communication terminal 2 via the relay device 3. The communication unit 10 includes a reception unit 11 and a transmission unit 12 that share a transmission/reception antenna 13. The reception unit 11 performs an amplification process, a down-conversion, and the like, on an OFDM signal received through the transmission/reception antenna 13, and outputs a base-band OFDM signal to the control unit 14. The transmission unit 12 performs an up-conversion, an amplification process, and the like, on a base-band OFDM signal for transmission that is generated by the control unit 14, and inputs an OFDM signal of a carrier wave band to the transmission/reception antenna 13. Thereby, through the transmission/reception antenna 13, the OFDM signal is wirelessly transmitted.

The control unit 14 is composed of a CPU and the like. The CPU of the control unit 14 runs an operational program stored in the storage unit 19. The control unit 14 performs an FFT (Fast Fourier Transform) process, and the like, on the OFDM signal outputted from the reception unit 11, and obtains a plurality of complex symbols which modulate a plurality of subcarriers which consist of the OFDM signal, respectively. Then, the control unit 14 converts the plurality of complex symbols thus obtained into bit data. Thereby, the control unit 14 obtains bit data that is included in the OFDM signal received through the transmission/reception antenna 13.

The control unit 14 also generates bit data for transmission, and generates a plurality of complex symbols corresponding to the bit data. Then, the control unit 14 performs an IFFT (Inverse FFT) process on the plurality of complex symbols thus generated, and generates a base-band OFDM signal in which the plurality of subcarriers modulated by the plurality of complex symbols are combined. The control unit 14 outputs the generated OFDM signal to the transmission unit 12.

In the control unit 14, a common channel setting unit 15, a channel allocation unit 16, a terminal identification unit 17, and a relay channel designation unit 18 are provided as function blocks.

The common channel setting unit 15 sets a common channel that is a communication channel commonly used by a plurality of communication terminals 2. The channel allocation unit 16 allocates, to each of communication object communication terminals 2, an individual channel that is a communication channel used for individual communication between the base station 1 and the communication terminal 2. The control unit 14 controls the communication unit 10, and thereby the base station 1 performs communication with the communication terminal 2 by using the common channel set by the common channel setting unit 15 while performing individual communication with the communication terminal 2 by using the individual channel allocated to this communication terminal 2 by the channel allocation unit 16. In the next-generation PHS, the common channel is called CCH (Common Channel), and the individual channel is called ICH (Individual Channel).

The terminal identification unit 17 identifies the communication terminal 2 that is communicating with the base station 1 via the relay device 3. In this embodiment, for example, the communication terminal 2 that is communicating with the base station 1 via the relay device 3 transmits a signal for notifying the base station 1 that its own device is communicating with the base station 1 via the relay device 3. This signal is transmitted to the base station 1 via the relay device 3. This enables the terminal identification unit 17 of the base station 1 to identify the communication terminal 2 that is communicating with the base station 1 via the relay device 3.

It may be also possible that the relay device 3 incorporates, into a signal received from the communication terminal 2, information indicating that this communication terminal 2 is communicating with the base station 1 via the relay device 3, and then relays this signal to the base station 1. In this case as well, the terminal identification unit 17 can identify the communication terminal 2 that is communicating with the base station 1 via the relay device 3. Hereinafter, the communication terminal 2 directly communicating with the base station 1 may be referred to as "direct communication terminal 2", and the communication terminal 2 communicating with the base station 1 via the relay device 3 may be referred to as "relayed terminal 2".

The relay channel designation unit 18 designates, with respect to the relayed terminal 2 identified by the terminal identification unit 17, a communication channel (hereinafter referred to as "relay channel") for a signal to be relayed by the relay device 3, such that the communication channel allocated by the channel allocation unit 16 is included therein. The control unit 14 generates a relay channel notification signal for notifying the relay channel designated by the relay channel designation unit 18, and incorporates it into the OFDM signal for transmission. The transmission unit 12 wirelessly transmits the OFDM signal including the relay channel notification signal to the relay device 3 through the transmission/reception antenna 13. The relay device 3 receives the OFDM signal including the relay channel notification signal from the base station 1, and then operates to relay only the signal of the relay channel notified by the relay channel notification signal.

In a case where the base station 1 does not communicate with the communication terminal 2 via the relay device 3, the terminal identification unit 17 and the relay channel designation unit 18 are not provided in the control unit 14 of this base station 1.

FIG. 3 is a block diagram showing a configuration of each relay device 3. As shown in FIG. 3, each of the relay devices 3 includes a base station side communication unit 30 for communication with the base station 1, a terminal side communication unit 34 for communication with the communication terminal 2, a control unit 38 for controlling the base station side communication unit 30 and the terminal side communication unit 34, and a storage unit 39 for storing various information.

The base station side communication unit 30 includes a reception unit 31 and a transmission unit 32 that share a transmission/reception antenna 33. The reception unit 31 performs an amplification process, a down-conversion, and the like, on the OFDM signal received through the transmission/reception antenna 33, and outputs a base-band OFDM signal to the control unit 38. The transmission unit 32 performs an up-conversion, an amplification process, and the like, on a base-band OFDM signal for transmission that is generated by the control unit 38, and inputs an OFDM signal of a carrier wave band to the transmission/reception antenna 33. Thereby, through the transmission/reception antenna 33, the OFDM signal is wirelessly transmitted to the base station 1.

The terminal side communication unit 34 includes a reception unit 35 and a transmission unit 36 that share a transmission/reception antenna 37. The reception unit 35 performs an amplification process, a down-conversion, and the like, on the OFDM signal received through the transmission/reception antenna 37, and outputs a base-band OFDM signal to the control unit 38. The transmission unit 36 performs an up-conversion, an amplification process, and the like, on a base-band OFDM signal for transmission that is generated by the control unit 38, and inputs an OFDM signal of a carrier wave band to the transmission/reception antenna 37. Thereby, through the transmission/reception antenna 37, the OFDM signal is wirelessly transmitted to the communication terminal 2.

The control unit 38 is composed of a CPU and the like. The CPU of the control unit 38 runs an operational program stored in the storage unit 39. The control unit 38 performs an FFT (Fast Fourier Transform) process, and the like, on the OFDM signal outputted from the reception unit 31 of the base station side communication unit 30, and obtains a plurality of complex symbols each of which is for modulating each of a plurality of subcarriers included in the OFDM signal. Then, the control unit 38 converts the plurality of complex symbols thus obtained into bit data. Thereby, the control unit 38 obtains bit data that is included in the OFDM signal received from the base station 1 through the transmission/reception antenna 33.

The control unit 38 also performs an FFT process, and the like, on the OFDM signal outputted from the reception unit 35 of the terminal side communication unit 34, and obtains a plurality of complex symbols each of which is for modulating each of a plurality of subcarriers included in the OFDM signal. Then, the control unit 38 converts the plurality of complex symbols thus obtained into bit data. Thereby, the control unit 38 obtains bit data that is included in the OFDM signal received from the communication terminal 2 through the transmission/reception antenna 37.

The control unit 38 obtains the bit data that is included in the OFDM signal received through the transmission/reception antenna 33, and then, based on the bit data, generates bit data for transmission to be transmitted to the communication terminal 2. The control unit 38 generates a plurality of complex symbols corresponding to the generated bit data. The control unit 38 performs an IFFT process on the plurality of complex symbols thus generated, and generates a base-band OFDM signal in which the plurality of subcarriers modulated by the plurality of complex symbols are combined. The control unit 38 outputs the generated OFDM signal to the transmission unit 36 of the terminal side communication unit 34. The transmission unit 36 transmits the received OFDM signal through the transmission/reception antenna 37. Thereby, the relay device 3 relays the signal received from the base station 1 to the communication terminal 2.

The control unit 38 obtains the bit data that is included in the OFDM signal received through the transmission/reception antenna 37, and then, based on the bit data, generates bit data for transmission to be transmitted to the base station 1.

The control unit 38 generates a plurality of complex symbols corresponding to the generated bit data. The control unit 38 performs an IFFT process on the plurality of complex symbols thus generated, and generates a base-band OFDM signal in which the plurality of subcarriers modulated by the plurality of complex symbols are combined. The control unit 38 outputs the generated OFDM signal to the transmission unit 32 of the base station side communication unit 30. The transmission unit 32 transmits the received OFDM signal through the transmission/reception antenna 33. Thereby, the relay device 3 relays the signal received from the communication terminal 2 to the base station 1.

In the relay device 3 according to this embodiment, when the reception unit 31 of the base station side communication unit 30 receives the relay channel notification signal transmitted from the base station 1, the control unit 38 controls the base station side communication unit 30 and the terminal side communication unit 34 so as to cause the relay device 3 to relay only the signal of the communication channel notified by the relay channel notification signal.

Next, a description will be given to a configuration of a TDMA/TDD frame 200 that is a communication frame of the communication system 100. FIG. 4 is a diagram showing a configuration of the TDMA/TDD frame 200. As shown in FIG. 4, the TDMA/TDD frame 200 is identified on a time-frequency plane with the horizontal axis and the vertical axis thereof representing time and frequency, respectively. One TDMA/TDD frame 200 includes an uplink frame 200$u$ by which the base station 1 receives a signal from the communication terminal 2, and a downlink frame 200$d$ by which the base station 1 transmits a signal to the communication terminal 2.

Each of the uplink frame 200$u$ and the downlink frame 200$d$ includes a first slot SL1 to a fourth slot SL4 in the time direction, and a first sub channel SCH1 to an i-th sub channel SCHi (i≥2) in the frequency direction. In this embodiment, for example, i=9 is set, and as shown in FIG. 4, each of the uplink frame 200$u$ and the downlink frame 200$d$ includes the first sub channel SCH1 to a ninth sub channel SCH9 in the frequency direction.

Hereinafter, when no particular distinction is required among the first slot SL1 to the fourth slot SL4, each of them may be simply referred to as "slot". Additionally, the slot of the uplink frame 200$u$ may be referred to as "reception slot", while the slot of the downlink frame 200$d$ may be referred to as "transmission slot". Moreover, when no particular distinction is required among the first sub channel SCH1 to the ninth sub channel SCH9, each of them may be simply referred to as "sub channel".

In the TDMA/TDD frame 200, the time width of one slot is set to be 625 μs. Accordingly, each of the uplink frame 200$u$ and the downlink frame 200$d$ has a time length of 2.5 ms, and one TDMA/TDD frame 200 has a time length of 5 ms. The bandwidth of one sub channel is 900 kHz, and one sub channel includes 24 subcarriers. One slot and one sub channel form a PRU (Physical Resource Unit) 210 that is a unit radio resource. Each of the uplink frame 200$u$ and the downlink frame 200$d$ includes thirty-six PRUs 210.

With respect to each of the uplink frame 200$u$ and the downlink frame 200$d$, the channel allocation unit 16 of the base station 1 allocates, as the individual channel, at least one PRU 210 of the thirty-six PRUs 210 to each of the plurality of communication terminals 2 that are communication objects, such that there is no overlap among the plurality of communication terminals 2. In the base station 1 according to this embodiment based on the next-generation PHS, the PRUs 210 located in the same position in the uplink frame 200$u$ and in the downlink frame 200$d$ are allocated as the individual channels to the same communication terminal 2. For example, in a case where the PRU 210 including the second slot SL2 and the sixth sub channel SCH6 and the PRU 210 including the third slot SL3 and the sixth sub channel SCH6 of the downlink frame 200$d$ are allocated as the individual channel for downlink communication to a communication terminal 2, the PRU 210 including the second slot SL2 and the sixth sub channel SCH6 and the PRU 210 including the third slot SL3 and the sixth sub channel SCH6 of the uplink frame 200$u$ are allocated as the individual channel for uplink communication to this communication terminal 2.

In the base station 1, the allocation of the individual channel to a communication terminal 2 is made in response to an allocation request from the communication terminal 2. When the reception unit 11 receives a signal including the allocation request from a communication terminal 2, the channel allocation unit 16 of the control unit 14 allocates an individual channel (PRU 210) to the communication terminal 2. Then, the control unit 14 generates an OFDM signal including an allocated channel notification signal for notifying the communication terminal 2 of the allocated individual channel, and causes the transmission unit 12 to transmit it. The communication terminal 2 receives the allocated channel notification signal from the base station 1, and then performs bi-directional individual communication with the base station 1 by using the individual channel (PRU 210) notified by the allocated channel notification signal.

In the communication system 100 described above, when the base station 1 is powered on and started, firstly, the common channel setting unit 15 sets the common channel. More specifically, the common channel setting unit 15 sets the first sub channel SCH1 in one of a plurality of transmission slots included in a plurality of TDMA/TDD frames 200, to be a common channel (hereinafter referred to as "downlink common channel") used for downlink communication. Then, the common channel setting unit 15 sets, in the uplink frame 200$u$ of the TDMA/TDD frame 200 to which the downlink common channel belongs, the first sub channel SCH1 in a reception slot (for example, the first slot SL1) located in the same position as the transmission slot (for example, the first slot SL1) of the downlink common channel, to be a common channel (hereinafter referred to as "uplink common channel") used for uplink communication.

In this manner, the common channel setting unit 15 sets a pair of the reception slot and the transmission slot of the same TDMA/TDD frame 200 to be the uplink common channel and the downlink common channel, respectively. In the base station 1, the common channel appears every plurality of TDMA/TDD frames 200. Accordingly, the base station 1 intermittently transmits a control signal (hereinafter, sometimes referred to as "CCH signal") of the downlink common channel. In the following, these plurality of TDMA/TDD frames 200 are referred to as "intermittent transmission frame". The time length of the intermittent transmission frame is called "LCCH (Logical CCH) interval".

The base station 1, when started, receives the CCH signal transmitted from the surrounding base station 1. Then, based on a result of the reception, the base station 1 identifies, among the plurality of transmission slots included in the intermittent transmission frame, a transmission slot in which the surrounding base station 1 does not transmit the CCH signal, and determines that this transmission slot is a transmission slot not used as the downlink common channel by the surrounding base station 1. Then, the base station 1 sets, as the downlink common channel, the first sub channel SCH1 of one transmission slot among the transmission slots not used as the downlink common channel by the surrounding base station 1, and moreover sets, as the uplink common channel, the first sub channel SCH1 of the reception slot located in the same position as the one transmission slot in the uplink frame 200*u* of the TDMA/TDD frame 200 to which the one transmission slot belongs.

In this manner, in the base station 1, the downlink common channel of its own device is set to be a timing other than a timing when the signal of the downlink common channel in the surrounding base station 1 is received. The base station 1 transmits the control signal by using the downlink common channel thus set, and receives the control signal from the communication terminal 2 by using the uplink common channel thus set.

In a case where the intermittent transmission frame includes, for example, twenty TDMA/TDD frames 200, the intermittent transmission frame includes eighty (=20×4) transmission slots and eighty reception slots that are paired respectively with the eighty transmission slots. Accordingly, a maximum of eighty base stations 1 can transmit CCH signals at different transmission timings, and receive control signals from communication terminals 2 at different reception timings. In such a case, therefore, a maximum of eighty base stations 1 can be located close to one another.

The communication terminal 2, when starting communication with the base station 1, receives the CCH signals from a plurality of base stations 1 located in the surroundings thereof, and determines a connection destination base station 1 based on the CCH signals. For example, the communication terminal 2 determines, as the connection destination base station 1, the base station 1 that is transmitting the CCH signal with the highest reception level among the CCH signals transmitted from the plurality of surrounding base stations 1. Then, based on the CCH signal transmitted by the connection destination base station 1, the communication terminal 2 synchronizes the TDMA/TDD frame 200 in its own device with the TDMA/TDD frame 200 in the connection destination base station 1. Then, by using the uplink common channel corresponding to the downlink common channel in which the connection destination base station 1 is transmitting the CCH signal, the communication terminal 2 transmits an allocation request signal for requesting allocation of an individual channel to the own device. The base station 1 receives the allocation request signal, and then the channel allocation unit 16 allocates a communication channel as the individual channel to the communication terminal 2 having transmitted the allocation request signal, and transmits the allocated channel notification signal to this communication terminal 2 by using the downlink common channel. Moreover, after the channel allocation unit 16 allocates the communication channel to the relayed terminal 2, the base station 1 transmits the relay channel notification signal described above to the relay device 3. The communication terminal 2 receives the allocated channel notification signal from the base station 1, and then performs bi-directional individual communication with the base station 1 by using the communication channel (PRU 210) notified by this allocated channel notification signal.

The relay device 3, when supplied with power and started, determines a relay object base station 1. For example, the relay device 3 receives the CCH signals from a plurality of base stations 1 located in the surroundings thereof, and determines, as the relay object base station 1, the base station 1 that is transmitting the CCH signal with the highest reception level among the plurality of CCH signals received. Then, after receiving the relay channel notification signal transmitted from the relay object base station 1, the relay device 3 operates to relay the signal of the communication channel notified by this relay channel notification signal. For example, in a case where the communication channel notified by the relay channel notification signal is the second sub channel SCH2 to the sixth sub channel SCH6 in the first slot SL1, the relay device 3 relays to the communication terminal 2 the signal of the second sub channel SCH2 to the sixth sub channel SCH6 in the first slot SL1 transmitted from the base station 1, and also relays to the base station 1 the signal of the second sub channel SCH2 to the sixth sub channel SCH6 in the first slot SL1 transmitted from the communication terminal 2.

<Detailed Description of Relay Operation in Relay Device>

Figure 5:
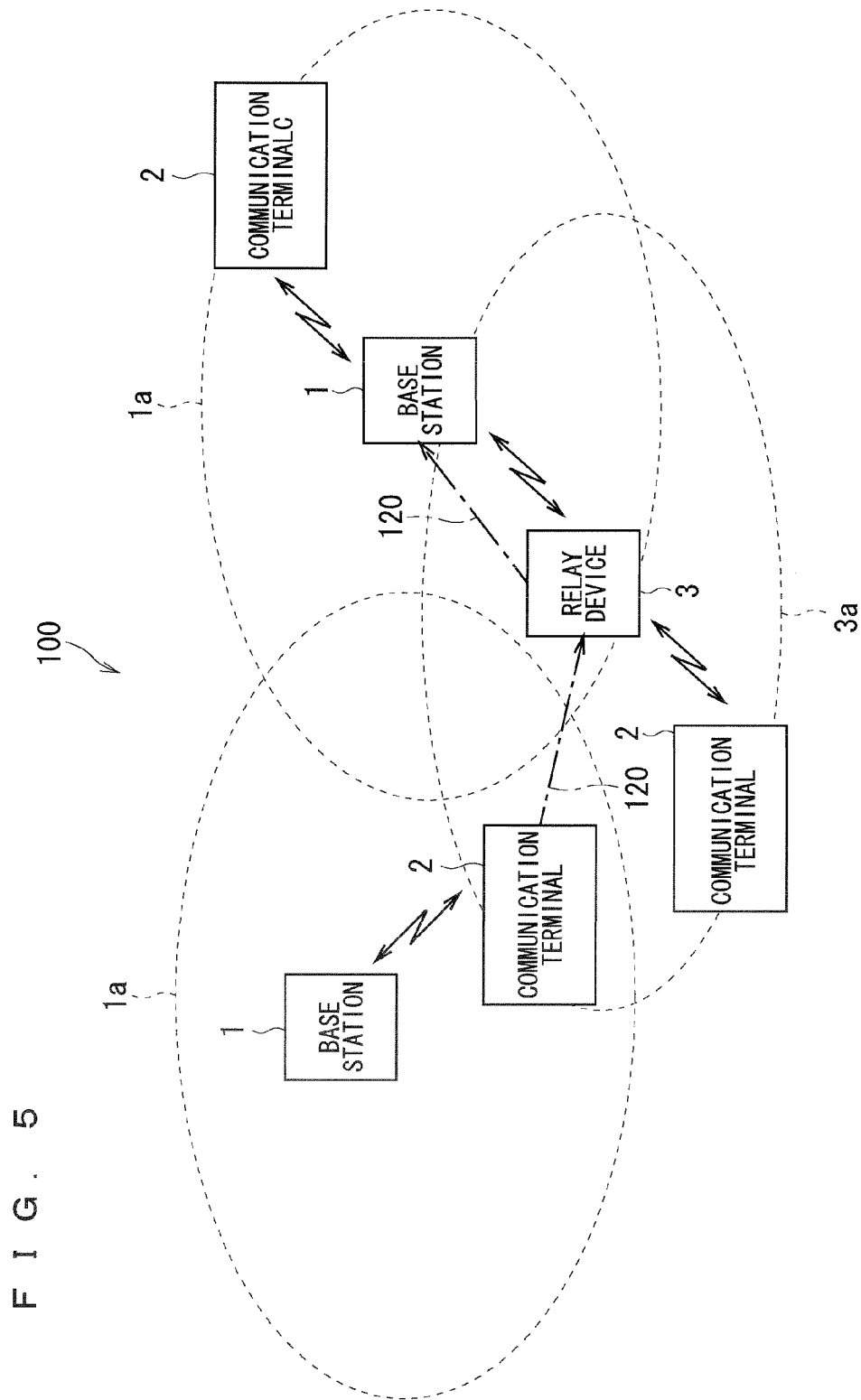
FIG. 5 A diagram showing a situation where the relay device relays an unnecessary wave to the base station.

Next, a relay operation in the relay device 3 will be described in detail. In the communication system 100 according to this embodiment, as shown in FIG. 1 described above, the communication area 3*a* of the relay device 3 partially overlaps not only the communication area 1*a* of the objective base station 1 (right-hand base station 1) to which the relay device 3 should relay signals, but also the communication area 1*a* of the base station 1 (left-hand base station 1) located in the surroundings thereof. Therefore, the communication terminal 2 that is communicating with this surrounding base station 1 may exist in the communication area 3*a* of the relay device 3. In this case, the relay device 3 receives an unnecessary wave from the communication terminal 2 that is not a relay object. FIG. 5 is a diagram showing such a situation.

As shown in FIG. 5, the communication terminal 2 that is communicating with the base station 1 (left-hand base station 1) different from the relay object base station 1 (right-hand base station 1), in other words, the communication terminal 2 that is not a relay object, exists in the communication area 3*a* of the relay device 3. Therefore, the relay device 3 receives an unnecessary wave 120 from the communication terminal 2 that is not a relay object. At this time, if the relay device 3 relays all the received signals to the base station 1, the relay device 3 transmits and relays even the received unnecessary wave 120 to the base station 1. As a result, in the base station 1, the unnecessary wave from the relay device 3 and the signal from the direct communication terminal 2 may interfere with each other. Additionally, in a case where a plurality of relay devices 3 are provided for the base station 1, the unnecessary wave from the relay device 3 and the signal from the communication terminal 2 that is communicating via another relay device 3 may interfere with each other in this base station 1. As a result, the communication quality of communication between the base station 1 and the communication terminal 2 may deteriorate. In the following, a description will be given to a specific example of a situation where the unnecessary wave from the relay device 3 and the signal from the communication terminal 2 that is in direct communication interfere with each other in the base station 1.

Figure 6:
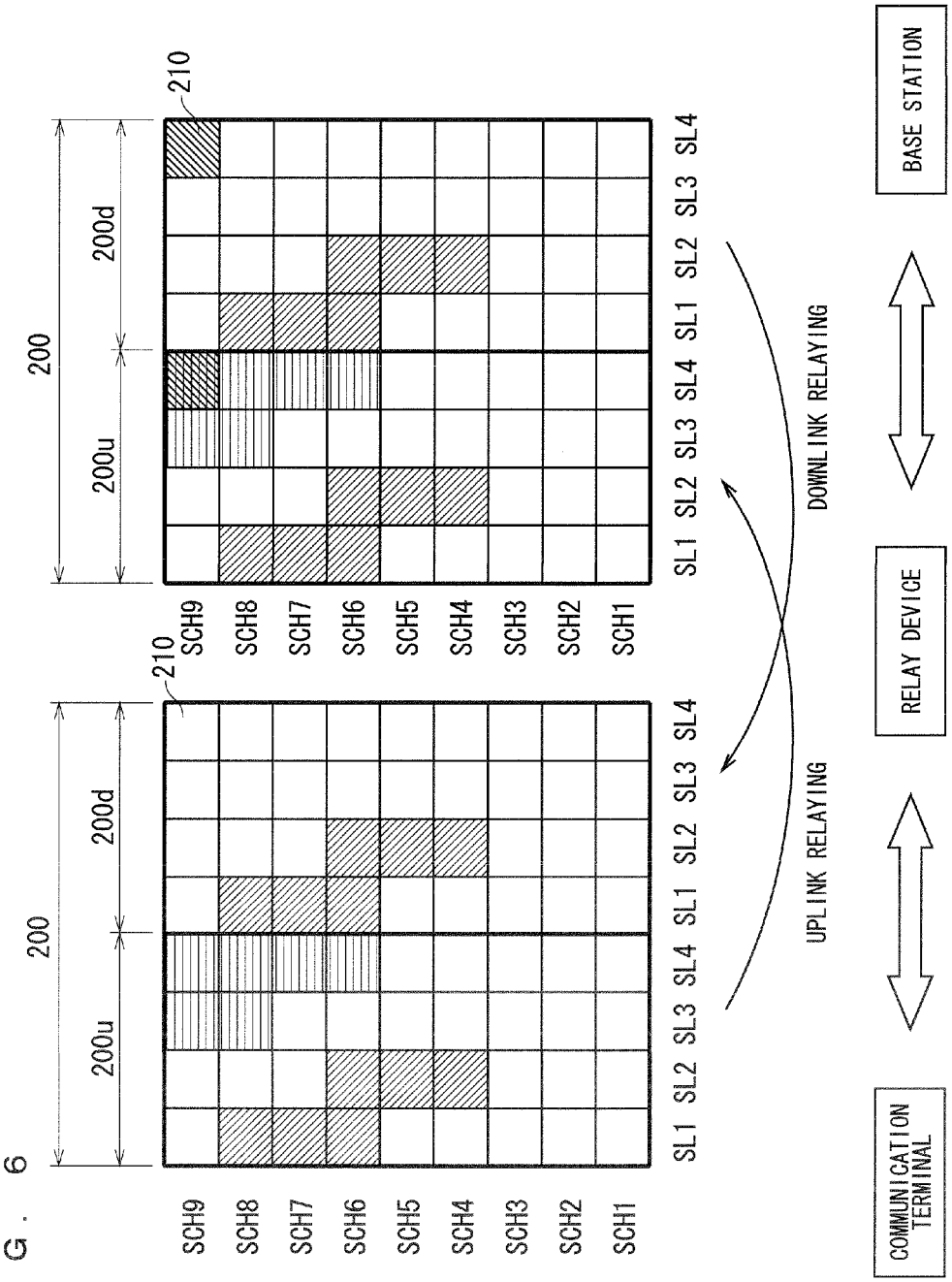
FIG. 6 A diagram showing a state of allocation of individual channels in the TDMA/TDD frame.

FIG. 6 is a diagram showing the TDMA/TDD frame 200 (at the right) used between the base station 1 and the relay device 3, and the TDMA/TDD frame 200 (at the left) used between the relay device 3 and the communication terminal 2. In FIG. 6, the communication channels (PRUs 210) allocated to the relayed terminal 2 are marked with negative slope diagonal lines. The communication channels (PRUs 210) allocated to the direct communication terminal 2 are marked with positive slope diagonal lines. In an example shown in FIG. 6, in the base station 1 the sixth sub channel SCH6 to the eighth sub channel SCH8 in the first slot SL1 and the fourth sub channel SCH4 to the sixth sub channel SCH6 in the second slot SL2 are allocated, as the communication channels, to the relayed terminal 2. Moreover, in the base station 1, the ninth sub channel SCH9 in the fourth slot SL4 is allocated as the communication channel to the direct communication terminal 2.

In this case, as marked with horizontal lines in the left-hand uplink frame 200*u*, if the relay device 3 receives an unnecessary wave from the communication terminal 2 that is communicating with a base station 1 different from the relay object base station 1 through the eighth sub channel SCH8 and the ninth sub channel SCH9 in the third slot SL3 and through the sixth sub channel SCH6 to the ninth sub channel SCH9 in the fourth slot SL4, the relay device 3 transmits the received interference wave by using the eighth sub channel SCH8 and the ninth sub channel SCH9 in the third slot SL3 and the sixth sub channel SCH6 to the ninth sub channel SCH9 in the fourth slot SL4. Consequently, as marked with horizontal lines in the right-hand uplink frame 200*u*, the base station 1 receives the unnecessary wave from the relay device 3 through the eighth sub channel SCH8 and the ninth sub channel SCH9 in the third slot SL3 and through the sixth sub channel SCH6 to the ninth sub channel SCH9 in the fourth slot SL4. In the example shown in FIG. 6, the ninth sub channel SCH9 in the fourth slot SL4 is allocated to the direct communication terminal 2, and therefore the unnecessary wave of the ninth sub channel SCH9 in the fourth slot SL4 transmitted from the relay device 3 and the signal of the ninth sub channel SCH9 in the fourth slot SL4 transmitted from the direct communication terminal 2 interfere with each other in the base station 1. As a result, the base station 1 may fail to properly receive the signal from the direct communication terminal 2. In the right-hand uplink frame 200*u*, to facilitate understanding of this interference situation, both the positive slope diagonal lines and the horizontal lines are marked in the ninth sub channel SCH9 in the fourth slot SL4.

In the communication system 100 according to this embodiment, to solve this problem, the base station 1 designates the relay channel such that the communication channel allocated to the relayed terminal 2 is included in the relay channel. Then, the base station 1 generates the relay channel notification signal for notifying the designated relay channel, and transmits it to the relay device 3. The relay device 3 operates to relay only the signal of the relay channel notified by the relay channel notification signal received from the base station 1. This can suppress a relay, from the relay device 3 to the base station 1, of the unnecessary wave supplied from the communication terminal 2 that is not a relay object. This consequently improves the communication quality of communication between the base station 1 and the communication terminal 2. In the following, a plurality of specific examples of a method for designating the relay channel will be described.

<First Relay Channel Designation Method>

FIG. 7 is a diagram showing the relay channel notification signal according to this example. In this example, the relay channel can be designated on a PRU 210 basis. As shown in FIG. 7, the relay channel notification signal includes one bit information indicating whether or not to relay a signal of a PRU 210 with respect to each of the thirty-six PRUs 210 included in each of the uplink frame 200*u* and the downlink frame 200*d*. That is, the relay channel notification signal includes one bit information indicating whether or not to relay a signal of a sub channel with respect to each of the first sub channel SCH1 to the ninth sub channel SCH9 in the first slot SL1, the first sub channel SCH1 to the ninth sub channel SCH9 in the second slot SL2, the first sub channel SCH1 to the ninth sub channel SCH9 in the third slot SL3, and the first sub channel SCH1 to the ninth sub channel SCH9 in the fourth slot SL4. In this example, when the one bit information corresponding to a PRU 210 is "1", it means that a signal of the PRU 210 should be relayed, and when the one bit information corresponding to a PRU 210 is "0", it means that a signal of the PRU 210 should not be relayed.

In this manner, in this example, the base station 1 can designate the relay channel on a PRU 210 basis, and therefore only the communication channel allocated to the relayed terminal 2 can be set to be the relay channel. In the example shown in FIG. 7, one bit information corresponding to each of the plurality of sub channels allocated to the relayed terminal 2 in the example shown in FIG. 6, namely, each of the sixth sub channel SCH6 to the eighth sub channel SCH8 in the first slot SL1 and the fourth sub channel SCH4 to the sixth sub channel SCH6 in the second slot SL2, is "1", whereby these sub channels are designated as the relay channel.

Figure 8:
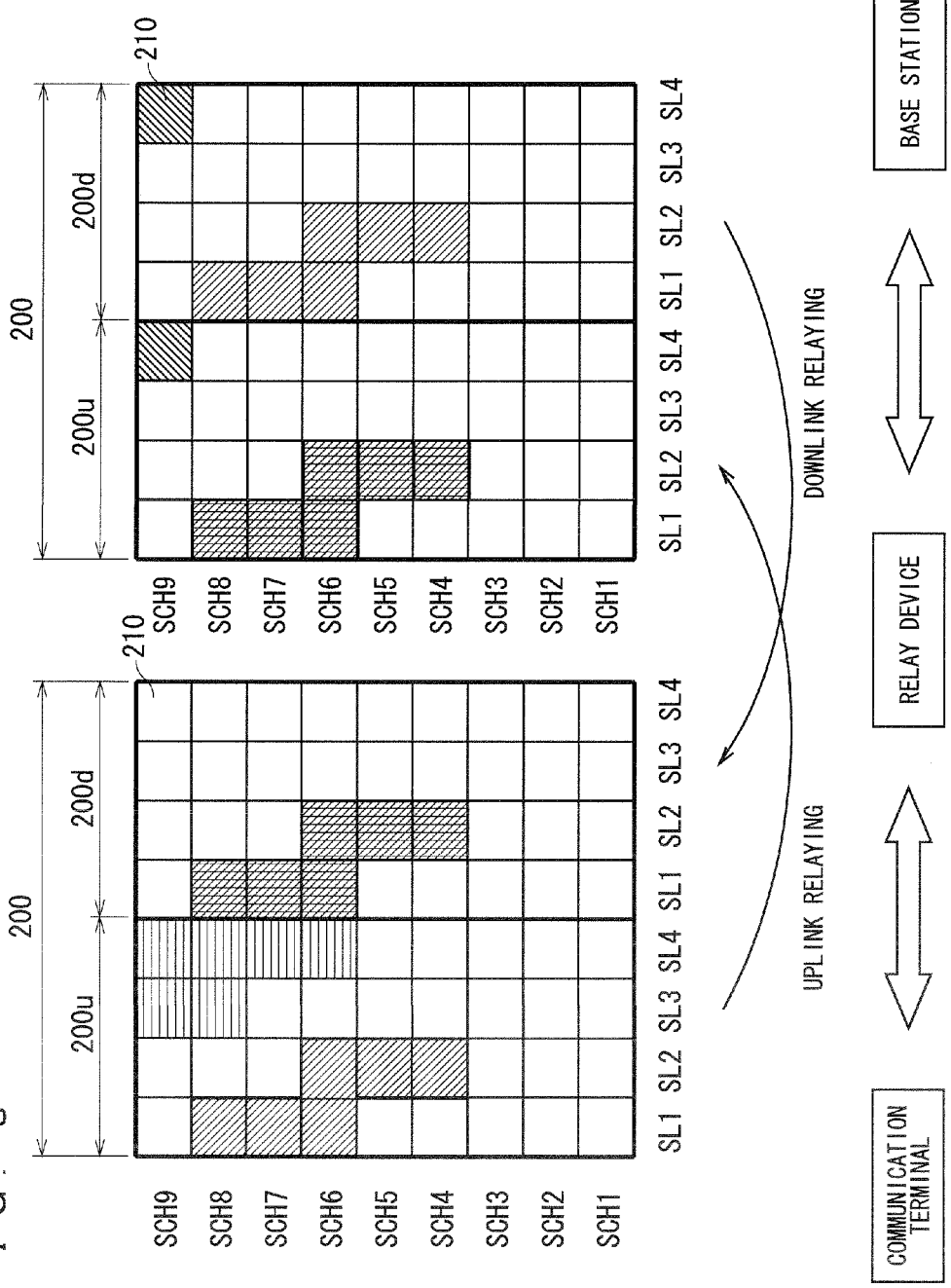
FIG. 8 A diagram showing a state of allocation of individual channels in the TDMA/TDD frame.

FIG. 8 is a diagram showing the TDMA/TDD frames 200 in a case where only the communication channels allocated to the relayed terminal 2 are designated as the relay channels in the above-described example shown in FIG. 6. In FIG. 8 and in FIGS. 10 and 12 which will be described later, the relay channels are marked with vertical lines. The sixth sub channel SCH6 to the eighth sub channel SCH8 in the first slot SL1 and the fourth sub channel SCH4 to the sixth sub channel SCH6 in the second slot SL2 are the communication channels allocated to the relayed terminal 2, and at the same time they are the relay channels. Therefore, in the left-hand downlink frame 200*d* and the right-hand uplink frame 200*u*, both the negative slope diagonal lines and the vertical lines are marked in these sub channels.

In a case where only the communication channels allocated to the relayed terminal 2 are designated as the relay channels, the relay device 3 relays only the signal of the communication channels allocated in the base station 1 to the relayed terminal 2. As a result, even though the relay device 3 receives an unnecessary wave from the communication terminal 2 that is communicating with a base station 1 different from the relay object base station 1 through the eighth sub channel SCH8 and the ninth sub channel SCH9 in the third slot SL3 and through the sixth sub channel SCH6 to the ninth sub channel SCH9 in the fourth slot SL4, the relay device 3 does not relay the unnecessary wave to the relay object base station 1. This consequently allows the base station 1 to properly receive the signal of the ninth sub channel SCH9 in the fourth slot SL4 transmitted from the direct communication terminal 2. Thus, the communication quality of communication between the base station 1 and the communication terminal 2 is improved.

<Second Relay Channel Designation Method>

Figure 9:
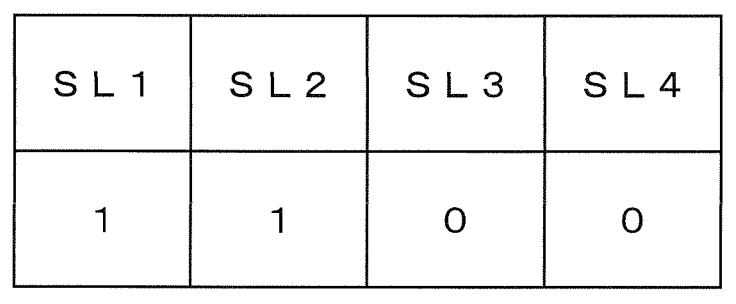

FIG. 9 is a diagram showing the relay channel notification signal according to this example. In this example, the relay channel can be designated with using, as a unit of designation, a resource group which consists of nine PRUs 210 arranged in the frequency direction. To be specific, in this example, the relay channel can be designated on a slot basis, and all the nine PRUs 210 included in the designated slot are set as the relay channels.

As shown in FIG. 9, the relay channel notification signal includes one bit information corresponding to each of the first slot SL1 to the fourth slot SL4. In this example, when the one bit information corresponding to a slot is "1", it means that a signal of all the PRUs 210 in the slot should be relayed, and when the one bit information corresponding to a slot is "0", it means that a signal of all the PRUs 210 in the slot should not be relayed. In the example shown in FIG. 9, the one bit information corresponding to each of the first slot SL1 and the second slot SL2 is "1", whereby all the PRUs 210 included in these slots are designated as the relay channels.

FIG. 10 is a diagram showing the TDMA/TDD frames 200 in a case where all the PRUs 210 in the first slot SL1 and the second slot SL2 are designated as the relay channels in the above-described example shown in FIG. 6. The sixth sub channel SCH6 to the eighth sub channel SCH8 in the first slot SL1 and the fourth sub channel SCH4 to the sixth sub channel SCH6 in the second slot SL2 are the communication channels allocated to the relayed terminal 2, and at the same time they are the relay channels. Therefore, in the left-hand downlink frame 200d and the right-hand uplink frame 200u, both the negative slope diagonal lines and the vertical lines are marked in these sub channels.

In a case where the base station 1 designates all the PRUs 210 in the first slot SL1 and the second slot SL2 as the relay channels such that the communication channels allocated to the relayed terminal 2 are included therein, even though the relay device 3 receives an unnecessary wave from the communication terminal 2 that is communicating with a base station 1 different from the relay object base station 1 through the eighth sub channel SCH8 and the ninth sub channel SCH9 in the third slot SL3 and through the sixth sub channel SCH6 to the ninth sub channel SCH9 in the fourth slot SL4, the relay device 3 does not relay the unnecessary wave to the relay object base station 1. This consequently allows the base station 1 to properly receive the signal of the ninth sub channel SCH9 in the fourth slot SL4 transmitted from the direct communication terminal 2, without causing interference between the signal and the unnecessary wave transmitted from the relay device 3. Thus, the communication quality of communication between the base station 1 and the communication terminal 2 is improved.

<Third Relay Channel Designation Method>

FIG. 11 is a diagram showing the relay channel notification signal according to this example. In this example, the relay channel can be designated with using, as a unit of designation, a resource group which consists of four PRUs 210 arranged in the time direction. To be specific, in this example, the relay channel can be designated on a sub channel basis, and all the designated sub channels in the first slot SL1 to the fourth slot SL4 are set as the relay channels.

As shown in FIG. 11, the relay channel notification signal includes one bit information corresponding to each of the first sub channel SCH1 to the ninth sub channel SCH9. When the one bit information corresponding to a sub channel is "1", it means that a signal of the sub channel in the first slot SL1 to the fourth slot SL4 should be relayed, and when the one bit information corresponding to a sub channel is "0", it means that a signal of the sub channel in the first slot SL1 to the fourth slot SL4 should not be relayed. In the example shown in FIG. 11, the one bit information corresponding to each of the fourth sub channel SCH4 to the eighth sub channel SCH8 is "1", whereby all of these sub channels in the first slot SL1 to the fourth slot SL4 are designated as the relay channels.

Figure 12:
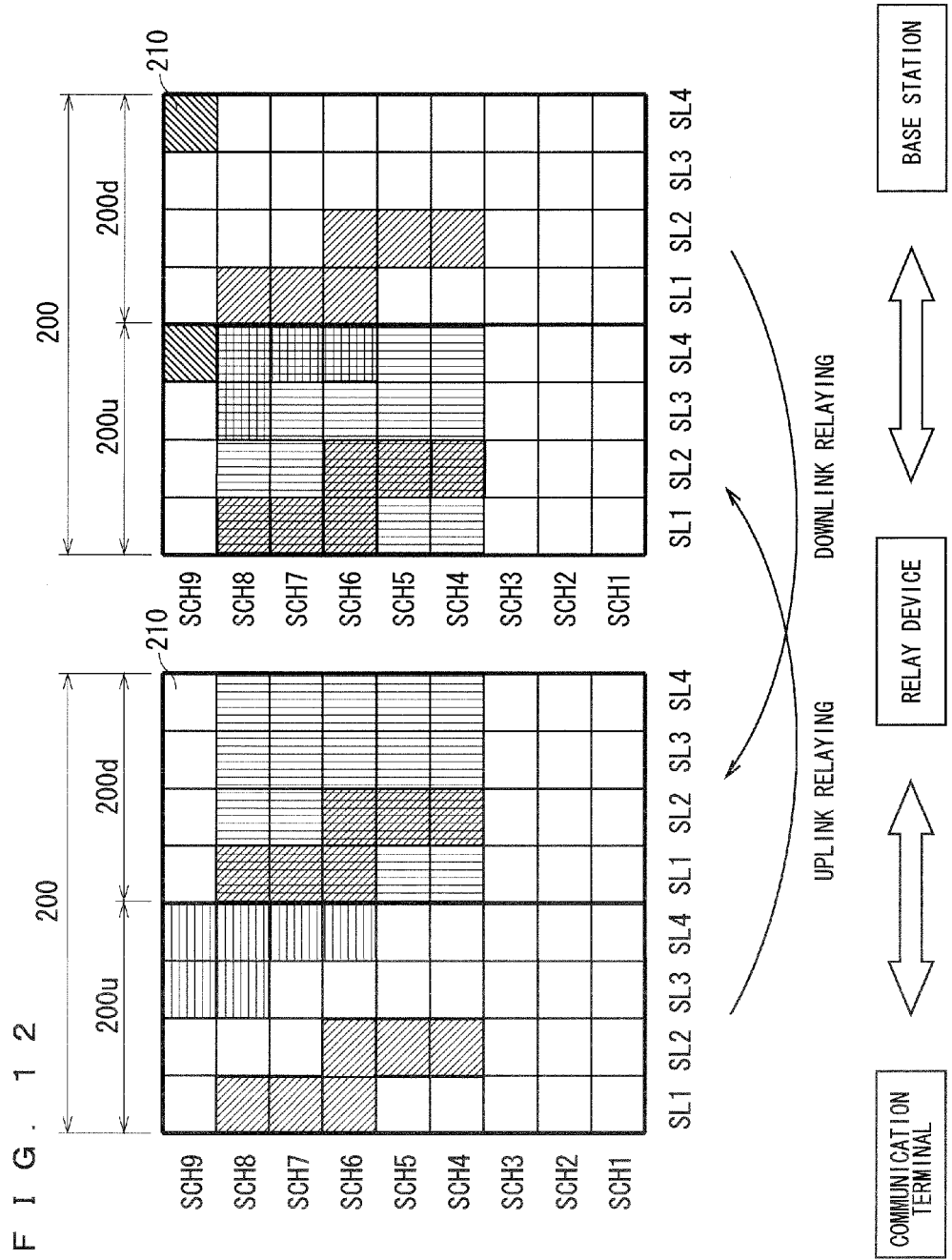
FIG. 12 A diagram showing a state of allocation of individual channels in the TDMA/TDD frame.

FIG. 12 is a diagram showing the TDMA/TDD frames 200 in a case where the fourth sub channel SCH4 to the eighth sub channel SCH8 in the first slot SL1 to the fourth slot SL4 are designated as the relay channels in the above-described example shown in FIG. 6. The sixth sub channel SCH6 to the eighth sub channel SCH8 in the first slot SL1 and the fourth sub channel SCH4 to the sixth sub channel SCH6 in the second slot SL2 are the communication channels allocated to the relayed terminal 2, and at the same time they are the relay channels. Therefore, in the left-hand downlink frame 200d and the right-hand uplink frame 200u, both the negative slope diagonal lines and the vertical lines are marked in these sub channels.

In a case where the base station 1 designates the fourth sub channel SCH4 to the eighth sub channel SCH8 in the first slot SL1 to the fourth slot SL4 as the relay channels such that the communication channels allocated to the relayed terminal 2 are included therein, if the relay device 3 receives an unnecessary wave from the communication terminal 2 that is communicating with a base station 1 different from the relay object base station 1 through the eighth sub channel SCH8 and the ninth sub channel SCH9 in the third slot SL3 and through the sixth sub channel SCH6 to the ninth sub channel SCH9 in the fourth slot SL4, the relay device 3 relays, to the relay object base station 1, only the unnecessary wave of the eighth sub channel SCH8 in the third slot SL3 and the sixth sub channel SCH6 to the eighth sub channel SCH8 in the fourth slot SL4. This consequently enables the base station 1 to properly receive the signal of the ninth sub channel SCH9 in the fourth slot SL4 transmitted from the direct communication terminal 2 without causing interference between the signal and the unnecessary wave transmitted from the relay device 3. Thus, the communication quality of communication between the base station 1 and the communication terminal 2 is improved. The eighth sub channel SCH8 in the third slot SL3 and the sixth sub channel SCH6 to the eighth sub channel SCH8 in the fourth slot SL4 are the communication channel of the unnecessary wave, and at the same time they are the relay channels. Therefore, in the right-hand uplink frame 200u, both the horizontal lines and the vertical lines are marked in these sub channels.

As described above, in this embodiment, the relay channel is designated so as to include the communication channel allocated to the relayed terminal 2, and the relay channel notification signal for notifying the designated relay channel is transmitted to the relay device 3. Accordingly, the relay device 3 does not relay any signal other than the signal of the communication channel notified by the base station 1. This can suppress a relay of an unnecessary wave from the relay device 3 to the base station 1. As a result, the base station 1 does not have to perform wasteful processing on the unnecessary wave, and moreover the communication quality of communication between the base station 1 and the communication terminal 2 is improved.

Furthermore, it suffices that the relay device 3 operates to relay only the signal of the relay channel notified by the base station 1. This can suppress a relay of an unnecessary wave from the relay device 3 to the base station 1, without a complicated configuration of the relay device 3. Thus, the relay device 3 can be achieved with an inexpensive configuration.

As shown in the first relay channel designation method described above, setting only the communication channels allocated to the relayed terminal 2 as the relay channels can surely suppress a relay of an unnecessary wave from the relay device 3 to the base station 1, and moreover can make effective use of radio resources.

In a case where the relay channel is designated with using, as a unit of designation, a resource group which consists of nine PRUs 210 arranged in the frequency direction or a resource group which consists of four PRUs 210 arranged in the time direction as shown in the second and third relay channel designation methods described above, it suffices that the relay device 3 performs a relay process on a resource group basis. Thus, the relay process in the relay device 3 can be simplified.

In a case where the relay channel is designated with using, as a unit of designation, a resource group which consists of a plurality of PRUs 210 as shown in the second and third relay channel designation methods, if there is a communication channel already allocated to the direct communication terminal 2 when the relay channel designation unit 18 designates the relay channel, the relay channel designation unit 18 designates the relay channel such that the communication channel already allocated is not included therein, as shown in FIGS. 10 and 12 described above.

When the channel allocation unit 16 allocates a communication channel to the direct communication terminal 2 after the relay channel designation unit 18 designates the relay channel, the channel allocation unit 16 allocates, to the direct communication terminal 2, a communication channel that does not belong to at least one resource group designated as the relay channel.

For example, in the example shown in FIG. 10, the channel allocation unit 16 allocates, to the direct communication terminal 2, a communication channel such as the third sub channel SCH3 in the third slot SL3 that belongs to neither of the resource group which consists of the nine PRUs 210 in the first slot SL1 nor the resource group which consists of the nine PRUs 210 in the second slot SL2 which are designated as the relay channel. As a result, even in a case where the relay channel is designated on a resource group basis, interference between the unnecessary wave relayed by the relay device 3 and the signal transmitted from the direct communication terminal 2 can be suppressed in the base station 1.

For additionally allocating a communication channel to the relayed terminal 2 in a case where the relay channels are designated with using the resource group as a unit of designation as shown in the second and third relay channel designation methods, it is desirable that the channel allocation unit 16 determines an additional communication channel from at least one resource group designated as the relay channels. For example, in the example shown in FIG. 10, it is desirable to determine an additional communication channel from the plurality of PRUs 210 in the first slot SL1 and the second slot SL2. In the example shown in FIG. 12, it is desirable to determine an additional communication channel from the fourth sub channel SCH4 to the eighth sub channel SCH8 in the first slot SL1 to fourth slot SL4.

In this manner, in the base station 1, for additionally allocating a communication channel to the relayed terminal 2, an additional communication channel is determined from at least one resource group designated as the relay channels. Therefore, it is not necessary to newly re-designate the relay channel. Accordingly, in the base station 1, there is no need to transmit the relay channel notification signal to the relay device 3 each time a communication channel allocated to the relayed terminal 2 is added.

Here, in a case where a communication channel not designated as the relay channel is determined as an additional communication channel, it is necessary that a resource group including this communication channel is added to the relay channel. As a result, the number of communication channels allocatable to the direct communication terminal 2 is reduced.

However, in a case where the additional communication channel is determined from at least one resource group designated as the relay channels, it is not necessary that another resource group is added to the relay channel. This can suppress a reduction in the number of communication channels allocatable to the direct communication terminal 2, which would be caused by additionally allocating a communication channel to the relayed terminal 2.

It may be acceptable that the relay device 3 transmits a signal from a relay source to a relay destination without performing frequency conversion thereon, or transmits the signal from a relay source to a relay destination with performing frequency conversion thereon. In a case where the relay device 3 transmits a signal from a relay source to a relay destination with performing frequency conversion thereon, a frequency band used for communication between the base station side communication unit 30 and the base station 1 is different from a frequency band used for communication between the terminal side communication unit 34 and the communication terminal 2. In other words, a frequency band of the first sub channel SCH1 to the ninth sub channel SCH9 used for communication between the base station 1 and the relay device 3 is different from a frequency band of the first sub channel SCH1 to the ninth sub channel SCH9 used for communication between the relay device 3 and the communication terminal 2. As a result, even if a transmission signal transmitted from the communication terminal 2 communicating with the base station 1 via the relay device 3 directly reaches the base station 1, this transmission signal is prevented from causing an interference wave in the base station 1. This is because a frequency band of this transmission signal is different from a frequency band processed by the base station 1.

<Modification>

In order that the relay device 3 can relay a signal from the base station 1 or the communication terminal 2 in real time, the relay device 3 costs.

On the other hand, a configuration in which the relay device 3 transmits a signal from the base station 1 to the communication terminal 2 with a delay or transmits a signal from the communication terminal 2 to the base station 1 with a delay can be achieved by providing in the relay device 3 a buffer for temporarily storing a received signal. Therefore, in this case, the costs of the relay device 3 can be kept low.

Figure 13:
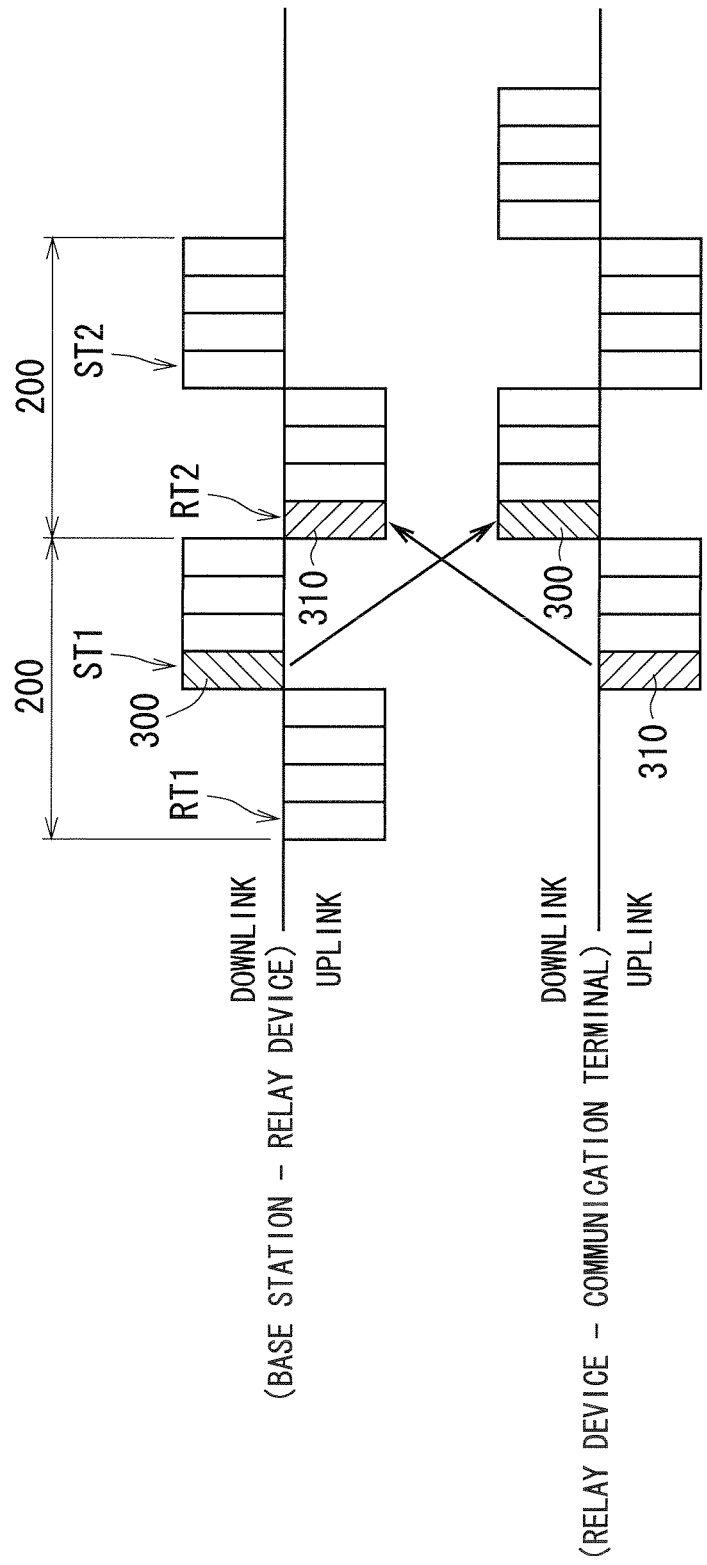
FIG. 13 A diagram showing a TDMA/TDD frame in a case where the relay device relays a signal with a delay.

In a case where the relay device 3 transmits a signal from the relay source to the relay destination with a delay, the base station 1 sometimes cannot receive the signal from the relayed terminal 2 in the uplink common channel that is set. FIG. 13 is a diagram showing such a situation. In the following description, in one example, the relay device 3 transmits a signal from the relay source to the relay destination with a delay of 0.5 frame.

In FIG. 13, the TDMA/TDD frame 200 used between the base station 1 and the relay device 3 is shown in the upper part, and the TDMA/TDD frame 200 used between the relay device 3 and the communication terminal 2 is shown in the lower part. In an example shown in FIG. 13, the uplink common channel and the downlink common channel are set in the first sub channels SCH1 in the first slots SL1 of the uplink frame 200*u* and the downlink frame 200*d* of the same TDMA frame 200.

As shown in FIG. 13, the base station 1 transmits a CCH signal 300 in the downlink common channel, and then the CCH signal 300 is received by the relayed terminal 2 after 0.5 frame because of the amount of delay in the relay device 3. The relayed terminal 2 transmits an allocation request signal 310 described above by using, in the TDMA/TDD frame 200 to which the first slot SL1 of the downlink frame 200*d* used for receiving the CCH signal 300 from the base station 1 belongs, a first slot SL1 of the uplink frame 200*u* that is paired with this first slot SL1. The allocation request signal 310 reaches the base station 1 after 0.5 frame because of the amount of delay in the relay device 3. Accordingly, the allocation request signal from the communication terminal 2 reaches the base station 1 at a reception timing (reception slot) that is later, by one frame, than the reception timing (reception slot) in which the uplink common channel is set. Therefore, the base station 1 cannot receive the allocation request signal from the communication terminal 2. As a result, in the base station 1, allocation of an individual channel to the communication terminal 2 having transmitted the allocation request signal is not performed, and thus the communication terminal 2 cannot perform individual communication with the base station 1.

Therefore, in this modification, the common channel setting unit 15 sets the uplink common channel, not only to an original reception timing of reception from the communication terminal 2, that is, to a reception timing RT1 (hereinafter referred to as "first reception timing RT1") when the base station 1 receives the signal from the direct communication terminal 2, but also to a reception timing RT2 (hereinafter referred to as "second reception timing") when the base station 1 receives the signal from the relayed terminal 2. In the example shown in FIG. 13, the common channel is set to the first sub channel SCH1 in the first slot SL1. Accordingly, the common channel setting unit 15 sets the uplink common channels not only to the first sub channel SCH1 in the first slot SL1 of the uplink frame 200u for receiving the allocation request signal from the direct communication terminal 2, but also to the first sub channel SCH1 in the first slot SL1 of the uplink frame 200u for receiving the allocation request signal from the relayed terminal 2. This allows the base station 1 to receive the signal from the direct communication terminal 2 in the original uplink common channel, and also to receive the allocation request signal from the relayed terminal 2, which is received with a delay, in the added uplink common channel.

Hereinafter, the uplink common channel set to the first reception timing RT1 will be referred to as "first uplink common channel", and the uplink common channel set to the second reception timing RT2 will be referred to as "second uplink common channel". In the TDMA/TDD frame 200 to which the first reception timing RT1 belongs, a transmission timing that is paired with this first reception timing RT1 will be referred to as "first transmission timing ST1" (see FIG. 13). For example, in a case where the first reception timing RT1 is a first slot SL1 of the uplink frame 200u, a first slot SL1 of the downlink frame 200d of the TDMA/TDD frame 200 to which the above-mentioned first slot SL1 belongs serves as the first transmission timing ST1. Likewise, in the TDMA/TDD frame 200 to which the second reception timing RT2 belongs, a transmission timing that is paired with this second reception timing RT2 will be referred to as "second transmission timing ST2" (see FIG. 13). The amount of delay of the second reception timing RT2 relative to the first reception timing RT1 will be referred to as "reception delay amount". In this example, the reception delay amount is one frame (=0.5 frame×2). In each of the relay devices 3, the same amount of delay is set. Therefore, the reception delay amount is also the same in the relay devices 3.

As described above, in each base station 1, the downlink common channel of the own device is set in, among the plurality of transmission slots included in the intermittent transmission frame, a transmission slot that is not set as the downlink common channel of the surrounding base station 1. Then, in each base station 1, the uplink common channel of the own device is set in a reception slot that is paired with the transmission slot set as the downlink common channel. Accordingly, there is a possibility that the uplink common channel of the surrounding base station 1 has been set to the second reception timing RT2 to which the second uplink common channel added by the base station 1 is set. In this case, the surrounding base station 1 receives the allocation request signal from the communication terminal 2 that is not a communication object, and ensures the communication channel for individual communication with this communication terminal 2. As a result, the number of radio resources that can be ensured for individual communication with the intended communication terminal 2 decreases, and thus an effective use of the radio resources cannot be made.

Therefore, in a case where a signal transmitted by the surrounding base station 1 at the first transmission timing ST1 paired with the first reception timing RT1, which means a CCH signal of the surrounding base station 1, is received, each base station 1 excludes, from candidates to which the downlink common channel of the own device is set, the transmission timing (that is, the second transmission timing ST2) that is later, by the reception delay amount, than the timing when this CCH signal is received, and also excludes, from candidates to which the uplink common channel of the own device is set, the reception timing (that is, the second reception timing RT2) paired with this transmission timing. For example, in a case where the common channel is set to the first sub channel SCH1 in the first slot SL1 and the reception delay amount is one frame, the base station 1 excludes, from the candidates to which the downlink common channel of the own device is set, the first sub channel SCH1 in the first slot SL1 of the downlink frame 200u that is later, by one frame, than the first slot SL1 of the downlink frame 200u in which the signal transmitted from the surrounding base station 1 at the first transmission timing ST1 is received, and also excludes, from the candidates to which the uplink common channel of the own device is set, the first sub channel SCH1 in the first slot SL1 of the uplink frame 200u that is paired with the above-mentioned first slot SL1. This can suppress a situation where the uplink common channel of the surrounding base station 1 is set to the second reception timing RT2 to which the second uplink common channel in the base station 1 has been set.

In this case, it is preferable that the base station 1 also sets the downlink common channel to the second transmission timing ST2 and transmits the above-described relay channel notification signal at this second transmission timing ST2. That is, it is preferable that the base station 1 sets an additional downlink common channel to the second transmission timing ST2 and transmits the relay channel notification signal by using this additional downlink common channel. In the second transmission timing ST2 of the base station 1, the downlink common channel of the surrounding base station 1 is not set. Therefore, if the relay channel notification signal is transmitted by using the first sub channel SCH1 of this second transmission timing ST2, interference between the relay channel notification signal and the CCH signal transmitted from the surrounding base station 1 can be prevented, while an effective use of the radio resources is made. Here, each base station 1 does not have to exclude, from the candidates to which the downlink common channel is set, the transmission timing that is later, by the reception delay amount, than the timing when the relay channel notification signal transmitted from the surrounding base station 1 through the additional downlink common channel is received.

In a case where, as shown in this modification, the relay device 3 relays the signal from the relay source to the relay destination with a delay, it may be possible that the terminal identification unit 17 determines whether or not this communication terminal 2 is the relayed terminal 2 based on the reception timing when the allocation request signal is received from the communication terminal 2. In the example shown in FIG. 13, the reception timing (second reception timing) when the allocation request signal is received from the relayed terminal 2 is delayed by one frame from the reception timing (first reception timing) when the allocation request signal is received from the direct communication terminal 2. Therefore, the terminal identification unit 17 can identify the communication terminal 2 having transmitted the allocation request signal received late as the relayed terminal 2. This eliminates the need for the communication terminal 2 to notify a base station 1 that the own device is communicating with this base station 1 via the relay device 3, and enables the base station 1 to transmit the relay channel notification signal to the relayed terminal 2 only through processing in its own device.

Although in the modification described above, the relay device 3 relays the signal from the relay source to the relay destination with a delay of 0.5 frame, the amount of delay caused in the relay device 3 may be any value as long as the base station 1 can receive the signal from the relayed terminal 2 in the uplink frame 200u.

The amount of delay caused in the relay device 3 may be set to be N frame (N is an integer equal to or greater than one) or (M+0.5) frame (M is an integer equal to or greater than zero), as long as the base station 1 sets the uplink common channel and the downlink common channel to be the slots located in the same position in the uplink frame 200u and in the downlink frame 200d of the TDMA/TDD frame 200. In other words, the amount of delay caused in the relay device 3 may be set such that double the amount thereof is equal to an integer multiple of the frame length.

In the embodiment and the modification described above, a case where the present invention is applied to the next-generation PHS has been described. However, the present invention is applicable to other communication systems. For example, the present invention is applicable to the LTE (Long Term Evolution) or the WiMAX (Worldwide Interoperability for Microwave Access).

While the invention has been described in detail, the foregoing description is in all aspects illustrative and not restrictive. It will be appreciated that numerous modifications unillustrated herein can be made without departing from the scope of the present invention.

DESCRIPTION OF THE REFERENCE NUMERALS 1 base station
2 communication terminal
3 relay device
11 reception unit
12 transmission unit
14 control unit
15 common channel setting unit
16 channel allocation unit
17 terminal identification unit
18 relay channel designation unit
30 base station side communication unit
34 terminal side communication unit
38 control unit
100 communication system
200 TDMA/TDD frame
200d downlink frame
200u uplink frame

The invention claimed is:

1. A base station communicating with a communication terminal via a relay device, the base station comprising:
   a reception unit for receiving a signal from a first communication terminal communicating with the base station via a relay device;
   a channel allocation unit for allocating a first communication channel to the first communication terminal;
   a relay channel designation unit for designating one or more communication channels to be relayed by the relay device, wherein the one or more communication channels comprise the first communication channel allocated by the channel allocation unit; and
   a transmission unit for transmitting, to the relay device, a notification signal for notifying the relay device of the one or more communication channels designated by the relay channel designation unit, such that the relay device relays, to the base station, only signals received at the relay device on the one or more communication channels designated by the relay channel designation unit.

2. The base station according to claim 1,
   wherein the reception unit also receives a signal from a second communication terminal communicating directly with the base station,
   wherein the channel allocation unit also allocates a second communication channel to the second communication terminal,
   wherein a reception timing, at which the reception unit receives a signal from the first communication terminal, is delayed from a reception timing, at which the reception unit receives a signal from the second communication terminal, and
   wherein the base station further comprises an identification unit for identifying that the first communication terminal is communicating with the base station via the relay device based on the reception timing at which the reception unit receives a signal from the first communication terminal.

3. The base station according to claim 1,
   wherein the channel allocation unit allocates, as the first communication channel, at least one of a plurality of unit radio resources identified on a time-frequency plane, and
   wherein the one or more communication channels only comprise communication channels that have been allocated to communication terminals that are communicating with the base station via the relay device.

4. The base station according to claim 1,
   wherein the channel allocation unit allocates, as the first communication channel, at least one of a plurality of unit radio resources identified on a time-frequency plane,
   wherein the one or more communication channels comprise at least one resource group consisting of a plurality of unit radio resources arranged in either a time direction or a frequency direction.

5. The base station according to claim 4, wherein, when the channel allocation unit allocates a second communication channel to a communication terminal communicating with the base station via the relay device, the channel allocation unit selects the communication channel from the at least one resource group.

6. The base station according to claim 4, wherein, when the channel allocation unit allocates a second communication channel to a communication terminal communicating directly with the base station, the channel allocation unit selects the second communication channel from unit radio resources that do not belong to the at least one resource group.

7. A base station communicating with a communication terminal via a relay device, the base station comprising:
   a reception unit for receiving a signal from a communication terminal communicating with the base station via a relay device, and receiving a signal from a communication terminal communicating directly with the base station;
   a channel allocation unit for allocating a communication channel to the communication terminal communicating with the base station via the relay device, and allocating a communication channel to the communication terminal communicating directly with the base station;
   a relay channel designation unit for designating a communication channel for a signal relayed by the relay device such that the communication channel allocated by the channel allocation unit to the communication terminal communicating with the base station via the relay device is included therein; and a transmission unit for transmitting, to the relay device, a notification signal for notifying the relay device of the communication channel designated by the relay channel designation unit, wherein, in a case where, when the relay channel designation unit designates the communication channel for a signal relayed by the relay device, a communication channel has been already allocated to the communication terminal communicating directly with the base station, the relay channel designation unit designates, while avoiding the communication channel which has been already allocated, the communication channel for a signal relayed by the relay device.

8. A base station communicating with a communication terminal via a relay device, the base station comprising:

a reception unit for receiving a signal from a communication terminal communicating with the base station via a relay device, and receiving a signal from a communication terminal communicating directly with the base station;

a channel allocation unit for allocating a communication channel to the communication terminal communicating with the base station via the relay device, and allocating a communication channel to the communication terminal communicating directly with the base station;

a relay channel designation unit for designating a communication channel for a signal relayed by the relay device such that the communication channel allocated by the channel allocation unit to the communication terminal communicating with the base station via the relay device is included therein; and a transmission unit for transmitting, to the relay device, a notification signal for notifying the relay device of the communication channel designated by the relay channel designation unit, wherein the reception unit receives a signal from the communication terminal communicating with the base station via the relay device, at a timing different from a timing at which a signal from the communication terminal communicating directly with the base station is received, wherein the base station further comprises a common channel setting unit for setting common channels for uplink communication to both of a first reception timing and a second reception timing, the first reception timing being a timing when the reception unit receives a signal from the communication terminal communicating directly with the base station, the second reception timing being a timing when the reception unit receives a signal from the communication terminal communicating with the base station via the relay device, wherein, in a surrounding base station located in surroundings of the base station, a common channel for downlink communication is not set to a transmission timing that is paired with the second reception timing in a communication frame to which the second reception timing belongs, and wherein the transmission unit transmits the notification signal at the transmission timing.

9. A base station for which the base station according to claim 8 is provided as a surrounding base station thereof, the base station comprising:

a reception unit for receiving a signal from the surrounding base station; and a common channel setting unit for setting a common channel for downlink communication to a timing other than a timing when the reception unit receives a signal of a common channel in the surrounding base station, wherein in a case where the reception unit receives a signal transmitted by the surrounding base station at a transmission timing paired with the first reception timing in a communication frame to which the first reception timing belongs, the common channel setting unit excludes, from a candidate to which a common channel for downlink communication is set, a transmission timing that is later than a timing of receiving the signal by an amount of delay of the second reception timing relative to the first reception timing, in a case where the reception unit receives the notification signal transmitted by the surrounding base station, the common channel setting unit does not exclude, from a candidate to which a common channel for downlink communication is set, a transmission timing that is later than a timing of receiving the notification signal by the amount of delay.

10. A relay device for relaying a signal from a communication terminal to a base station and relaying a signal from a base station to a communication terminal, the relay device comprising:

a base station side communication unit for communicating with a base station;

a terminal side communication unit for communicating with a communication terminal; and a control unit for controlling the base station side communication unit and the terminal side communication unit, wherein the base station side communication unit receives a notification signal transmitted from the base station, the notification signal indicating one or more communication channels to be relayed by the relay device, and wherein the control unit controls the base station side communication unit and the terminal side communication unit such that the relay device relays, to the base station, only signals received in the one or more communication channels indicated by the notification signal.

11. A communication system comprising:

a base station communicating with a communication terminal via a relay device; and a relay device relaying a signal from the communication terminal to the base station and relaying a signal from the base station to the communication terminal, wherein the base station includes a reception unit for receiving a signal from a communication terminal communicating with the base station via the relay device, a channel allocation unit for allocating a first communication channel to the communication terminal, a relay channel designation unit for designating one or more communication channels to be relayed by the relay device, wherein the one or more communication channels comprise the first communication channel allocated by the channel allocation unit, and a transmission unit for transmitting, to the relay device, a notification signal for notifying the relay device of the one or more communication channels designated by the relay channel designation unit, wherein the relay device includes a base station side communication unit for communicating with the base station, a terminal side communication unit for communicating with the communication terminal, and a control unit for controlling the base station side communication unit and the terminal side communication unit, wherein the base station side communication unit receives the notification signal transmitted from the base station, and wherein the control unit controls the base station side communication unit and the terminal side communication unit such that the relay device relays, to the base station, only signals received in the one or more communication channels notified by the notification signal.

\* \* \* \* \*